United States Patent

Pirich

[11] 4,387,989
[45] Jun. 14, 1983

[54] COHERENT OPTICAL FEATURE IDENTIFIER APPARATUS

[75] Inventor: Andrew R. Pirich, Marcy, N.Y.

[73] Assignee: The United States of America as represented by the Secretary of the Air Force, Washington, D.C.

[21] Appl. No.: 171,614

[22] Filed: Jul. 23, 1980

[51] Int. Cl.³ .................... G06K 9/58; G06K 9/76
[52] U.S. Cl. ................... 356/71; 350/162.13
[58] Field of Search .......... 356/71; 350/162 SF, 350/162.12, 162.13

[56] References Cited

U.S. PATENT DOCUMENTS

| | | |
|---|---|---|
| 3,409,872 | 11/1968 | Hogg et al. ................. 356/71 X |
| 3,461,301 | 8/1969 | Fitzmaurice et al. ........... 356/71 X |
| 3,539,260 | 11/1970 | Burch .......................... 356/71 |
| 3,571,603 | 3/1971 | Bryant ......................... 356/71 X |
| 3,689,772 | 9/1972 | George et al. ................ 356/71 X |
| 3,743,422 | 7/1973 | Wood .......................... 350/162 SF |
| 3,779,492 | 12/1973 | Grumet ....................... 356/71 X |

*Primary Examiner*—Vincent P. McGraw
*Attorney, Agent, or Firm*—Donald J. Singer; William Stepanishen

[57] ABSTRACT

A coherent optical feature identifier apparatus utilizing an optical data gathering system in conjunction with a digital data correlator unit to recognize uninterpretable features on photographs. A dual visual display is utilized to compare a desired feature with the Fourier transform correlation from the comparator storage unit.

8 Claims, 6 Drawing Figures

COHERENT OPTICAL FEATURE IDENTIFIER APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to coherent optical systems, and in particular to a coherent optical feature identifier apparatus.

Coherent optics is a natural approach to processing two-dimensional pictorial data as millions of bits of information can be processed in parallel, and complex operations, such as special analysis by Fourier transformation, and pattern correlation can be accomplished with a simple configuration of lenses. However, coherent optical processing has not been susceptable in the past in high speed automatic processing of data because of the large numbers of different filters required and the alignment problems associated therewith.

SUMMARY OF THE INVENTION

The present invention utilizes an optical system to scan areas of photographs through a spatial filter disk having a plurality scaling factors thereon to permit correlation of obtained data with stored data. The spatial composite filter is comprised of known feature power spectrum information which is arranged in a wedge-pattern on a circular disk.

A variable sized circular aperture provides peak correlation and power spectra (Fourier Transform) information between different sized areas of the film from which objects may be recognized independent of scale. A CCD (charge coupled device) camera is used to scan the output correlation plane for detection of peak correlation values and specific power spectra locations for determination of features.

It is one object of the present invention, therefore, to provide an improved coherent optical feature identifier apparatus.

It is another object of the invention to provide an improved coherent optical feature identifier apparatus wherein a spatial filter system is utilized in detecting and recognizing features.

It is another object of the invention wherein the spatial filter disk improves the detection of features via the power spectrum information.

It is still another object of the invention which is able to identify features such as targets from aerial photography even though the orientation of the feature is rotated.

It is yet another object of the invention wherein the identification of features occurs in near real time.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
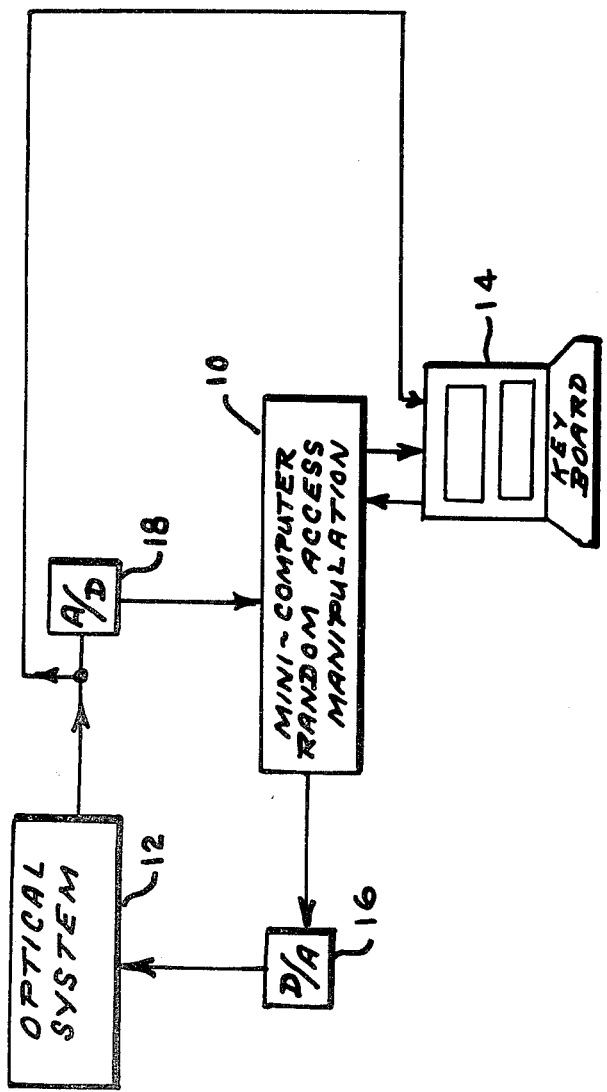
FIG. 1 is a block diagram of the coherent optical feature identifier apparatus according to the present invention.

Referring now to FIG. 1, there is shown a complete block diagram of the coherent optical feature identifier apparatus utilizing a mini-computer 10, such as a PDP-11/40, to store locations of known power spectra features (base data), to control the optical system 12, and, to correlate and recognize features. A dual screen television display unit 14 with a keyboard is utilized to transmit instructions to the mini-computer 10. The display unit 14 receives and displays feature signals from the optical system 12 and the digital Fourier Transform correlation data from the mini-computer 10. The received feature data is simultaneously displayed on the dual screen television display unit 14 to provide a direct visual comparison of a recognized particular feature. The interface between the mini-computer 10 and the optical system 12 is by means of a digital to analog (D/A) converter unit 16. The interface of the optical system 12 to the mini-computer 10 is by means of an analog to digital (A/D) converter unit 18. The optical system 12 provides analog feature signals directly to the dual screen television display unit 14.

The optical system 12 is utilized to focus upon a particular area of an aerial photograph to distinguish and recognize the feature thereon. The illuminated area is focused upon a detection plane wherein peak correlation values are obtained. These peak correlation values are applied via the analog to digital converter unit 18 to the mini-computer 10. In the mini-computer 10, the comparison of the peak Fourier Transform values is accomplished with their stored digital complement. When the comparison of the signals results in an equality, the particular features under scrutiny has been recognized. Therefore, the identification of the feature will be placed on one of the screens of the dual screen television display unit 14 and the digital Fourier Transform correlation will be placed on the other screen, for further comparison purposes.

Figure 2:
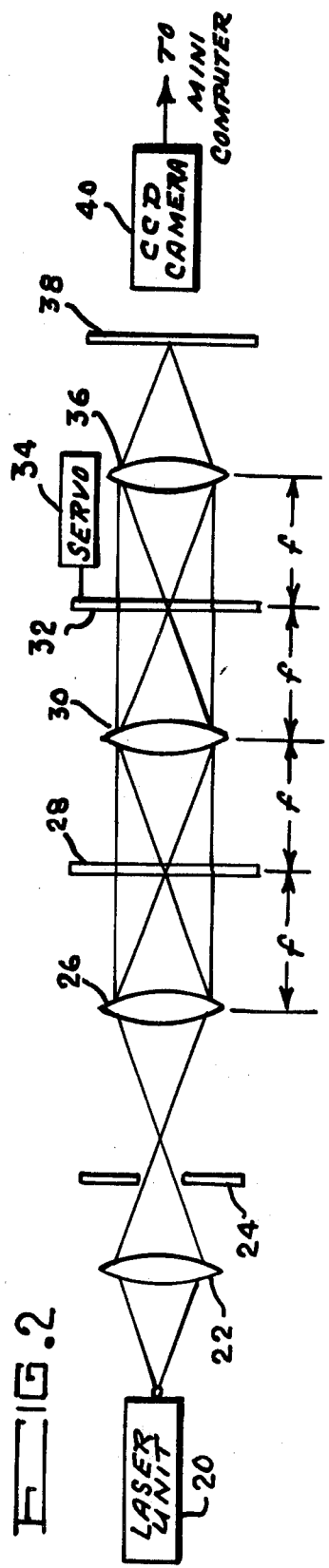
FIG. 2 is a schematic diagram of the optical system utilized in the coherent optical feature identifier apparatus.

Turning now to FIG. 2, there is shown a schematic diagram of the optical system in greater detail. A laser unit 20 which is utilized as a point source provides a coherent light output. The output light from the laser unit 20 is applied through collimating lens 22 to the variable aperture 24. The size of the variable aperture 24 may be varied to control the amount of light that falls upon focusing lens 26. The coherent light is focused by focusing lens 26 upon the film 28 which is in a liquid gate to compensate for variations in film thickness. A Fourier Transform lens 30 collects the light which passes through the film 28 and transforms it to power spectra information. A spatial filter disk 32 which is controlled by a servo rotator unit 34 is positioned between the Fourier Transform lens 30 and a final focusing lens 36. The spatial filter disk 32 is one of an assembly of disks which are rotated into the optical system focal plane to provide correlation of features on the film with known feature power spectrum information that is arranged in a wedge-shaped pattern on a circular disk. The focusing lens 36 focuses the light from the spatial filter 32 upon the detection plane 38. A CCD (charge coupled device) camera 40 is utilized to scan the output correlation plane 38 for detection of peak correlation values and specific power spectra locations for the determination.

The optical system operates in the following manner. The laser unit 20 would be of the blue green (Argon) type. The coherent light from the laser unit 20 is projected through a variable aperture 24. A circular aperture and associated optical focal lengths are the factors that determine the size of area to be illuminated on the film. It may be noted that f represents the focal length which is shown in FIG. 2 and they are equal. In most applications, the thickness variations of film are entirely undesired, and cannot easily be controlled. It is possible to remove the effects of these variations by means of a device called a liquid gate. Such a device is comprised of two optical flats, between which an index matching oil can be sandwiched to compensate for the variable thickness of different photographic films. The index of refraction of the oil must be chosen by compromise, for it is impossible to match simultaneously the different indices of the base, the emulsion, and the glass which is usually flat on only one side. However, with a proper choice of oil, the optical path length through the liquid gate can be made nearly constant, allowing the amplitude transmittance of the film and gate to be written:

$$\sqrt{t(x,y)} = \tau(x,y) \ .$$

The desired area is then transformed through the Fourier Transform lens 30 and is focused into the spatial filter disk 32. The servo motor 34 steps through the four different type character disks. The peak correlation values are focused on the detection plane 38 by the focusing lens 36. A CCD (Charged Coupled Device) camera 40 detects the peak correlation values. The mini-computer, in a matrix format, determines maximum peak correlation and identifies the particular feature.

Figure 3:
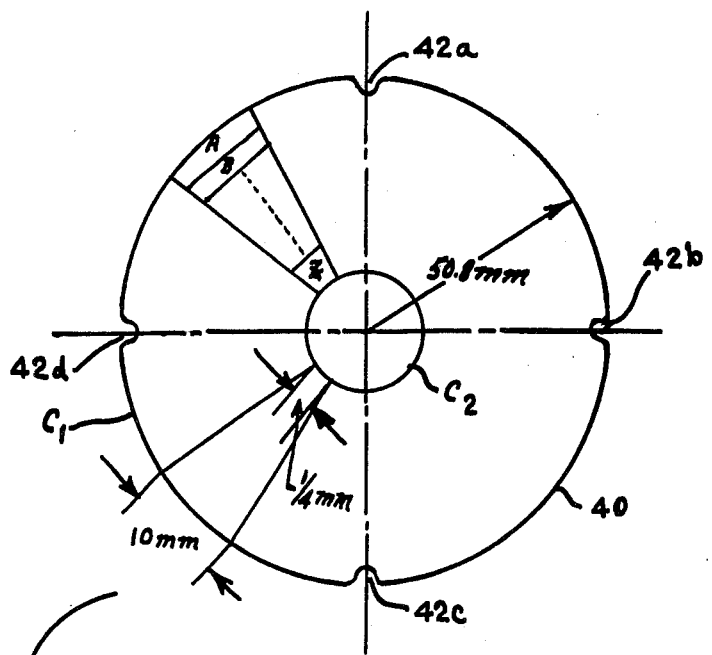
FIG. 3 is a front view in simplified schematic and pictorial form of a constituent representative spatial filter disk member of the preferred embodiment of the present invention.

There is shown in FIG. 3 a representative spatial filter disk that is utilized in the present invention. The spatial filter disk 40 is comprised of 32 wedges with 26 features per wedge, and consequently, 832 features per disk. For illustrative purposes on a few representative wedges are shown. Each wedge is approximately 10 mm at the perimeter $C_1$, of the disk and ¼ mm at the disk axis $C_2$.

Each wedge contains a different view of the same features with 26 variations in scale for each view. There is therefore possible to have 832 features on each spatial filter disk. The wedge is divided into 26 sections, herein designated A through Z and not shown in scale but merely in representative form. Each sections contains a known power spectrum (Fourier Transform) of a feature, such as an airplane.

Since the transform may be reduced in scale, by a weighing factor, each section contains the same power spectra of the airplane, but reduced in scale.

$$F(\omega) = \int_{-\infty}^{+\infty} f(t) e^{i\omega t} dt \quad (1)$$

$$F(\omega) = \int_{-\infty}^{-\infty} WF(t) e^{i\omega t} dt \quad (2)$$

where w=scale weighting factor. This would accommodate variation in scale of reconnaissance photographing.

The disk 40 does not need to be rotated, because the views and scales are adjusted according to the peak power sprectra that is obtained. The disk 40 will be notched in four locations 42a–d (90° apart to fit in one particular location when a correlation is to be determined. The disk 40 is made of clear glass (soda-lime-silica type) ⅜ inch thick with an emulsion deposition of power spectra data in scale variance in each of the 26 sections of each of the 32 wedges. The power spectrum data varies only in a scaling or weighing factor.

The correlation is obtained from the correlation detecting plane by means of a CCD camera. Behind each disk in the detection plane is a CCD (charge coupled device) camera which is used to scan the output correlation plane for detection or peak correlation values.

Figure 5:
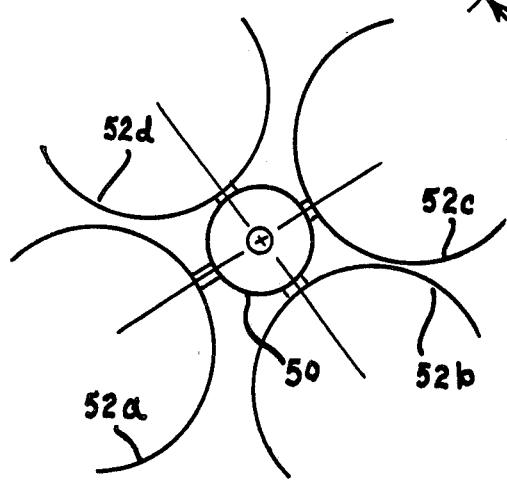

In FIG. 5, there is shown in simplified schematic form a servo turret rotator 50 with four disk holding frames 52a–d mounted thereto. This is the means which is shown in FIG. 2 that positions the various spatial filter disks in the optical system to provide a peak correlation with a feature on the photographic film.

Figure 4A:
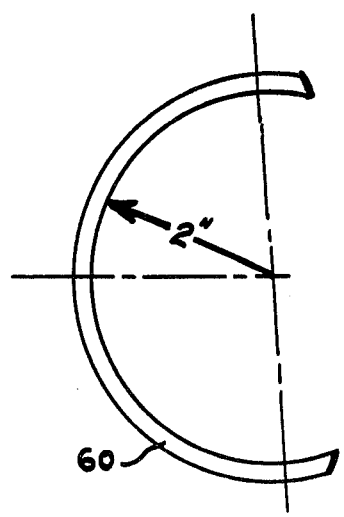
FIGS. 4a and 4b are the front and side views respectively of a representative spring-loaded frame holder for the spatial filter disk, and, FIG. 5 is a front view of the turret arrangement for rotating the spatial filter disk members within the optical system.
Figure 4B:
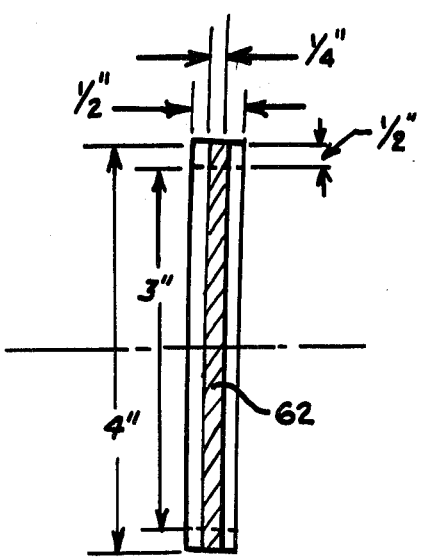

There is shown in FIG. 4b in greater detail the spring-loaded frame holder for the spatial frame filter disk wherein a spring steel frame 60 comprises a tempered steel frame with a semi-circular shape with the central dimension shown. The frame 60 includes a ¼ inch groove 62 into which is fitted and held a spatial filter disk. The overall dimensions of the spring steel frame 60 as shown.

FIG. 5 illustrates the servo controlled turret which is utilized to rotate one of four spatial filter disks into the optical lens of sight in the optical system. Further, the turret provides the means by which a spatial filter disk is rotated through its entire 32 wedge section to achieve a correlation with an illuminated feature from the photographic film.

Although the invention has been described with reference to a particular embodiment, it will be understood to those skilled in the art that the invention is capable of a variety of alternative embodiments within the spirit and scope of the appended claims.

What is claimed is:

1. An optical correlator for identifying features on a photographic film comprising in combination:
    means for generating a source of coherent light, said coherent light being non-divergent,
    means for focusing said coherent light through said photographic film, said photographic film including an index of refraction matching means attached to said photographic film,
    a spatial filter disk in alignment with and interacting with said focusing means, said spatial filter disk comprises a glass disk with a plurality of wedge sections inscribed thereon, each wedge section of said plurality of wedge sections being divided into a plurality of linearly decreasing sub-regions, each sub-region having a discrete emulsion deposition that is characteristic of a particular feature, a Fourier Transform lens between said means for focusing coherent light and said spatial filter disk, said spatial filter disk having a Fourier Transform power spectra emulsion deposited thereon, said spatial filter disk providing an optical correlation signal in response to the coincidence of a photographic film feature and a corresponding filter disk Fourier Transform power spectra feature, and, means for detecting said optical correlation signal positioned in alignment with said spatial filter disk, said detecting means providing an analog signal in response to said optical correlation signal.

2. Apparatus as described in claim 1 wherein said index of refraction matching means is a liquid gate which comprises a first and second glass plate members with an index matching oil sandwiched therebetween, the index of refraction of the combination being varied as the distance between the first and second glass plate members vary.

3. Apparatus as described in claim 1 wherein said emulsion deposition is a photographic film emulsion that is deposited on said glass disk.

4. Apparatus as described in claim 2 wherein said index matching oil is a light mineral oil.

5. Apparatus as described in claim 2 wherein said emulsion deposition is a photographic film emulsion that is deposited on said glass disk.

6. Apparatus as described in claim 5 further including means for rotating one of a plurality of said spatial filter disk into alignment with said focusing means, to achieve a peak correlation signal of the Fourier Transform power spectra.

7. Apparatus as described in claim 5 wherein said generating means comprises an Argon laser.

8. Apparatus as described in claim 5 wherein said detecting means comprises a charge-coupled device camera.

* * * * *